United States Patent [19]

Gilbert

[11] Patent Number: 4,838,141
[45] Date of Patent: Jun. 13, 1989

[54] BAGPIPES AND A BAG THEREFOR
[75] Inventor: Gary Gilbert, Edinburgh, Scotland
[73] Assignee: W. L. Gore & Associates, Inc., Newark, Del.
[21] Appl. No.: 218,713
[22] Filed: Jul. 13, 1988
[30] Foreign Application Priority Data Oct. 22, 1987 [GB] United Kingdom ............... 8724743

[51] Int. Cl.⁴ .................................................. G10D 7/06
[52] U.S. Cl. .................................................. 84/380 B
[58] Field of Search ...................................... 84/380 B

[56] References Cited

U.S. PATENT DOCUMENTS 4,194,041 3/1980 Gore et al. ........................... 428/315

FOREIGN PATENT DOCUMENTS 4933 2/1914 United Kingdom ............. 84/380 B
1346605 2/1974 United Kingdom ............. 84/380 B
1346606 2/1974 United Kingdom ............. 84/380 B Primary Examiner—Lawrence R. Franklin
Attorney, Agent, or Firm—Dena Meyer

[57] ABSTRACT

A pipe bag is constructed from a flexible composite material which is airtight but readily permits the transmission of moisture vapor. At least one layer of the flexible composite material is a continuous hydrophilic layer. When a moisture vapor concentration gradient is present across said hydrophilic layer it transfers substantial amounts of water throug the layer by absorbing water on the side of the layer at which the higher water vapor concentration exists, and desorbing water on the opposite side of the layer at which the water vapor concentration is lower. As a result of this the moisture concentration within the bag is regulated.

7 Claims, 2 Drawing Sheets

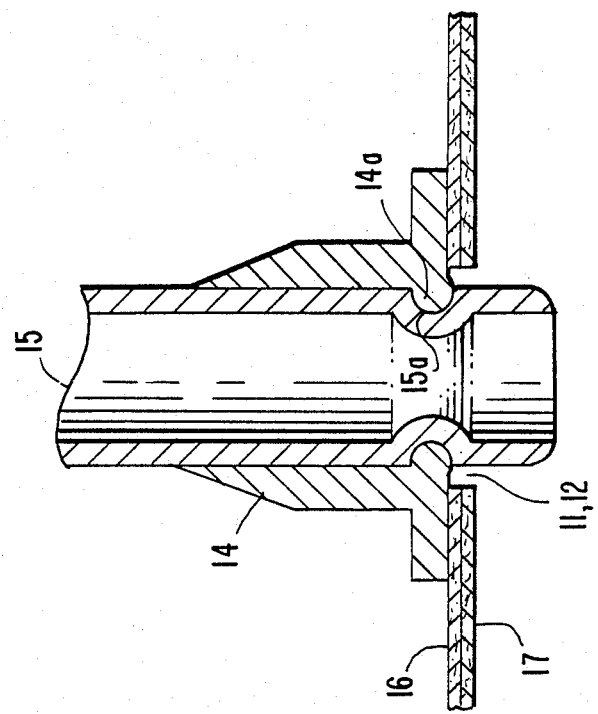
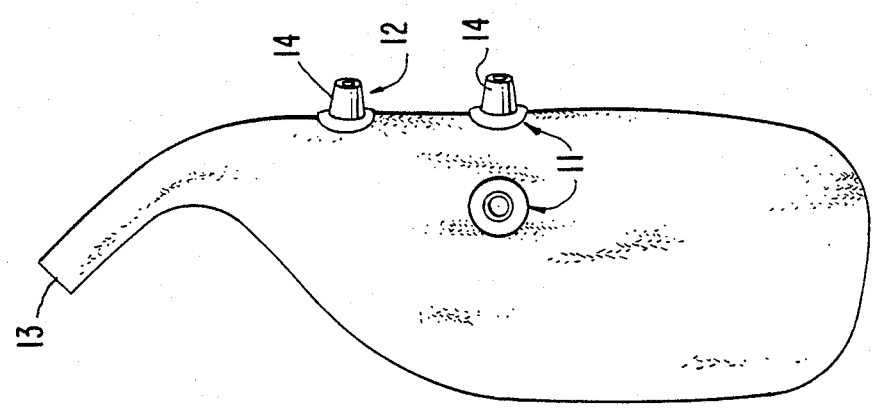

BAGPIPES AND A BAG THEREFOR

BACKGROUND

1. Field of the Invention

This invention relates to bagpipes and in particular to the pipe bag of the bagpipes.

2. Background of the Invention

Bagpipe bags are conventionally made from animal hide, and in particular sheepskin. The animal hide is cut and sewn into shape, then stocks are bound into each of five apertures to allow the connection of three drones, a mouthpiece, and a chanter. In use, the bag, which is inflated by the piper through the mouthpiece, supplies air to the drones and chanter, each of which employs a reed to convert the flow of air into sound.

Conventional bags have a number of disadvantages. First, moisture in the form of spittle and condensation from the piper's breath can collect in the bag causing the reeds to become damp and so affecting the pitch and tone of the instrument. This can be a serious problem during extended playing sessions. Secondly, the bags require a lot of maintenance, as frequent seasoning is necessary to keep the hide supple and airtight. Thirdly, binding a set of stocks into a bag can be a laborious, time-consuming process. Fourthly, the useful life of a bag can be significantly less than one year.

It has been proposed in British Patent Application 8964/71 (Canadian Pat. No. 961677) to make a pipe bag of polyvinyl chloride and to control the problem of collected moisture in the bag by fitting into the bag a sponge to absorb the moisture. It was suggested that from time to time the chanter could be removed and the sponge squeezed between the bag walls to expel most of the moisture. Such a proposal however appears unlikely to protect the reeds from becoming damp.

The term "Hydrophilic layer" as used herein is restricted to continuous layers, including closed cell foamed layers. These layers do not allow the flow of gases or liquids through open pore channels in the material but do transfer substantialyamounts of water through the layer by absorbing water on one side of the layer where the water vapour concentration is high, and desorbing or evaporating it on the opposite side of the layer where the water vapour concentration is low.

Hydrophobic, as used here, means that water will not spread on the material and wick into its porous structure. A drop of water placed on the surface of a highly hydrophobic layer will remain in the form of a nearly spherical bead with an advancing water contact angle greater than 90 degrees. Water vapor which evaporates or desorbs from the adjacent hydrophilic layer is free to flow or diffuse as a gas through the pores of a the hydrophobic layer to the exterior environment.

Moisture vapor transmission rates refer to values measured using a modified version of test method ASTM-E96-B in which the air gap between the surface of the water and the material to be tested is eliminated by inverting the cup to bring the water directly into contact with the surface of the test material. This modified test method is illustrated and described in full in U.S. Pat. No. 4,194,041.

SUMMARY OF THE INVENTION

The present invention provides a pipe bag, for bag pipes, made of a flexible composite material which is air-impermeable and has a moisture vapor transmission rate exceeding 1000 gms/m$^2$ day, the material comprising at least two layers, one layer being a continuous hydrophilic layer and a second layer external of the one layer being a supporting layer.

The present invention also provides a pipe bag for bagpipes, made of a flexible composite air-impermeable material comprising a plurality of layers, one layer being a hydrophobic layer, another layer being a continuous hydrophilic layer and a further layer of a textile material, each layer having a moisture vapour transmission rate exceeding 1000 gms/m$^2$ day and the textile layer being external to the other two layers.

BRIEF DESCRIPTION OF THE FIGURES

FIG. 2 is a side view of the pipe bag formed by folding and sealing cut edges of the composite material and fitting stock receivers, and FIG. 3 is a sectional view through a part of the bag, a stock receiver fitted thereto, and a stock received therein.

DETAILED DESCRIPTION OF THE PREFERRED EMBODIMENT

Figure 1:
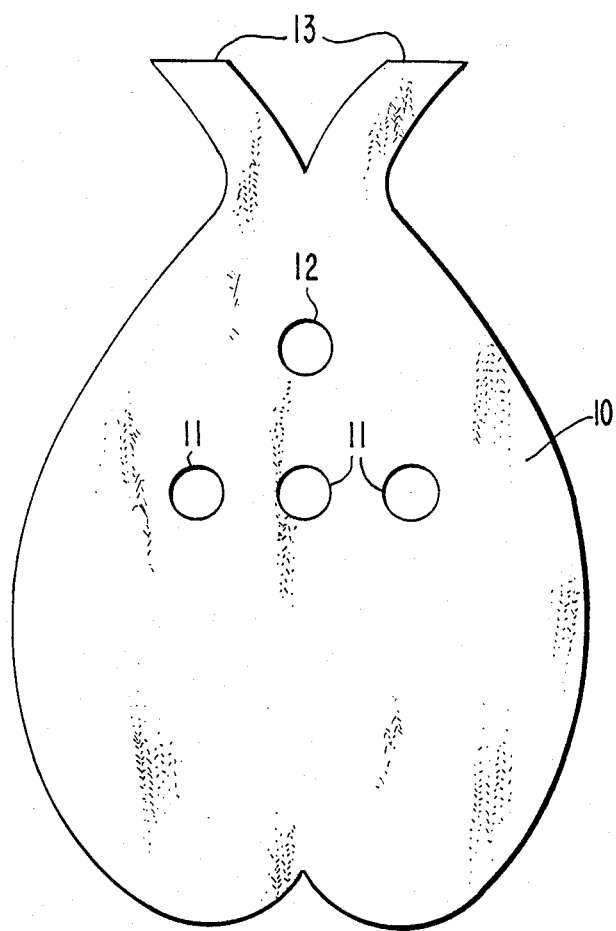
FIG. 1 shows a shaped piece of flexible composite material for forming the bag, the shaped piece having been cut by use of a template of the same shape.

The invention can best be understood with reference to FIG. 1. The composite material, from which the shaped piece 10 is cut, is permeable to moisture vapour but not to air. Preferred materials are described in U.S. Pat. No. 4,194,041. In particular the composite material comprises a hydrophobic layer, such as microporous expanded polytetrafluoroethylene (PTFE) which has been coated with a hydrophilic layer.

Two commercially available hydrophilic materials have been found that embody the requisite properties for this invention. One is an organic polymer with a hydrophilic backbone sold under the trademark Hypol by W. R. Grace & Co. Hypol is a reactive prepolymer that can be crosslinked by water and/or multifunctional amines, including blocked carbamate amines. Hypol has a backbone of polyoxyethylene units which end with toluene diisocyanate groups. The structure is essentially a polyether-polyurethane with a maximum of three reactive isocyanate (NCO) groups per molecule. The second hydrophilic material is a fluorocarbon with hydrophilic side groups sold under the trademark Nafion by E.I. duPont de Nemours & Co. Nafion is a copolymer of tetrafluoroethylene and a monomer such a perfluoro-3,6-dioxa-4methyl-7-octensulfonic acid.

Because of the great chemical difference of these hydrophilic polymers, it is believed there are additional suitable hydrophilic materials that could be useful.

This two layer composite can be bonded to a textile layer, for example a woven nylon fabric. The two layer composite can be laminated to the woven fabric by gravure printing a dot pattern of adhesive onto the hydrophobic side of the laminate, pressing the woven fabric to the hydrophobic side through a pair of nipped rollers, and then curing the adhesive. The two layer composite is itself an air impermeable waterproof material having a moisture vapour transmission rate of at least 1000 gms/m$^2$ day and the supporting layer must also have at least this moisture vapour transmission rate, but need not itself be air or water impermeable.

The three layer composite material 10 thus produced is cut to the shape illustrated in FIG. 1 in order to be formed into a pipe bag. Three holes 11 are formed to correspond to the positions of the drones and a fourth hole 12 for the mouthpiece. A fifth hole 13 is formed for the chanter when the shape is folded double along its axis of symmetry and sewn into the basic shape illustrated in FIG. 2, with the woven nylon fabric supporting layer facing inward. After sewing up the bag, the seams are sealed in order to make them airtight using a heat sealable tape which is coated with a suitable thermoplastic resin adhesive has been melted using a stream of heated air. The pipe bag is then turned inside-out through the chanter hole 13, to place the woven nylon fabric on the outside.

Stock receivers 14 are bonded onto the pipe bag at the holes 11, 12 corresponding to the drone and mouthpiece positions as illustrated in FIG. 2.

The receivers into which the stocks are connected are preferably formed by attaching moulded tubular components for example of elastomeric poly(vinylchloride) on to the appropriately positioned apertures. Alternatively, the receivers can be formed from extensions of the composite material.

FIG. 3 illustrates a stock receiver 14 bonded over a hole 11 or 12 in the flexible composite material 10. This drawing also shows the material to comprise the woven nylon fabric 16 and the flexible two layer laminate 17. The Figure further shows a stock 15 held in place in the stock receiver 14 by means of a ring 14a integral with receiver 14 engaging in an annular recess 15a in the stock 15.

The drone and mouthpiece stocks are fitted into the elastomeric poly(vinylchloride) stock receivers 14 in the manner indicated in FIG. 3, and additional elastic bands are preferably placed around the necks of the stock receivers to ensure airtight seals. The chanter stock is bound into the remaining hole 13 using tying-in hemp.

When the drones, mouthpiece and chanter have been inserted into the appropriate stocks, the completed instrument can be played by a piper in the normal manner.

The only function of the woven nylon fabric in the above example is to improve the mechanical and tactile properties of the flexible two layer composite material. The flexible composite material functions independently of any additional fabric layers, provided that the layers are not bonded together by a continuous layer of adhesives, so that the present invention is neither limited to any particular fabric, nor to only one layer of fabric.

It will be appreciated by anyone skilled in the art of manufacturing articles from synthetic components that it is possible to use a range of methods to form bonds, and that the seams of the bag in the present invention could be formed, for example, by welding the two parts together.

The example illustrates two methods of attaching stocks to a pipe bag, various combinations of these two methods are possible, and the method of attachment of stocks is not limited to these two methods. Where elastomeric moulded components are used as stock receivers a variety of materials can be used, and the geometry of said components is not restricted to that illustrated in FIG. 3.

The preferred materials for use in the present invention are those disclosed in U.S. Pat. No. 4,194,041. However, from the foregoing discussion it will be appreciated that other composite materials can be used in the present invention provided that:

(1) they comprise at least one continuous hydrophilic layer which readily permits the transmission of water vapour, and (2) all additional layers readily permit the transmission of water vapour.

Pipe bags constructed according to the present invention can overcome many, and possibly all, of the disadvatages of conventional, animal hide pipe bags. Firstly, the moisture level inside a bag is regulated as a result of the nature of the composite material. A high moisture level inside the bag gives rise to a moisture concentration gradient which results in transfer of moisture through the hydrophilic layer, and ultimately through the entire composite material, in an outward direction. This ensures that the pitch and tone of the bagpipes do not change during a playing session. Secondly, the preferred composite materials are inherently supple and airtight and so require no maintenance. For the purposes of hygiene, it is possible to launder the bags. Thirdly, in certain embodiments of the invention the incorporation of moulded, elastomeric tubular components as receivers for the stocks facilitates rapid assembly of the whole instrument, with no need to bind the stocks in. Fourthly, a bag according to the invention has a much longer potential life expectancy than a skin bag, and does not need to be 'run-in' or matured.

I claim:

1. A pipe bag, for bagpipes, made of a flexible composite material which is air-impermeable and has a moisture vapour transmission rate exceeding 1000 gms/m$^2$ day the material comprising at least two layers, one layer being a continuous hydrophilic layer and a second layer external of said one layer being a supporting layer.

2. A pipe bag according to claim 1, wherein the second layer is a hydrophobic layer.

3. A pipe bag according to claim 1 or claim 2, wherein the hydrophilic layer is formed as a coating on the hydrophobic layer.

4. A pipe bag according to claim 2, wherein the hydrophobic layer is microporous PTFE.

5. A pipe bag according to claim 1, or 2 wherein the hydrophilic layer is a reactive prepolymer that can be crosslinked by water and/or multifunctional amines, including blocked carbamate amines or a fluorocarbon with hydrophilic side groups.

6. A pipe bag, for bagpipes, made of a flexible composite air-impermeable material comprising a plurality of layers, one layer being a hydrophobic layer, another layer being a continuous hydrophilic layer and a further layer of a textile material, each laying having a moisture vapour transmission rate exceeding 1000 gms/m$^2$ day and said textile layer being external to the other two said layers.

7. A bagpipe comprising a pipe bag made of a flexible composite air-impermeable material having a plurality of layers, one layer being a hydrophobic layer, another layer being a continous hydrophilic layer and a further layer of a textile material, each layer having a moisture vapour transmission rate exceeding 1000 gms/m$^2$ day and said textile layer being external to the other two said layers.

* * * * *